(12) United States Patent
Mysore

(10) Patent No.: US 6,304,558 B1
(45) Date of Patent: Oct. 16, 2001

(54) NETWORK DISPATCH MANAGER, DISPATCH GATEWAY, AND A METHOD FOR PROVIDING DISPATCH SERVICE TO DISPATCH CLIENTS VIA A PACKET-SWITCHED NETWORK

(75) Inventor: Jayanth Pranesh Mysore, Hoffman Estates, IL (US)

(73) Assignee: Motorola, Inc., Schaumburg, IL (US)

(*) Notice: Subject to any disclaimer, the term of this patent is extended or adjusted under 35 U.S.C. 154(b) by 0 days.

(21) Appl. No.: 09/322,564

(22) Filed: May 28, 1999

(51) Int. Cl.$^7$ .............................. H04Q 7/00; H04Q 7/24; H04J 3/24
(52) U.S. Cl. ................ 370/312; 370/328; 370/338; 370/349; 455/426; 455/458; 455/466
(58) Field of Search .................... 370/312, 349, 370/328, 329, 330, 338; 455/426, 458, 466, 422, 456, 520, 518

(56) References Cited

U.S. PATENT DOCUMENTS

| | | | |
|---|---|---|---|
| 5,416,770 | * | 5/1995 | Stoner et al. ............................ 370/60 |
| 5,678,180 | * | 10/1997 | Mehta et al. ......................... 455/33.1 |
| 5,711,011 | * | 1/1998 | Urs et al. ............................... 455/520 |
| 5,924,041 | * | 7/1999 | Alperovich et al. ................. 455/456 |
| 6,021,326 | * | 2/2000 | Nguyen ................................. 455/422 |
| 6,026,296 | * | 2/2000 | Sanders, III et al. ................ 455/426 |
| 6,041,048 | * | 3/2000 | Erickson et al. ...................... 370/349 |

* cited by examiner

*Primary Examiner*—Wellington Chin
*Assistant Examiner*—M. Phan
(74) *Attorney, Agent, or Firm*—Jeffrey K. Jacobs

(57) ABSTRACT

The present invention addresses the need for providing dispatch service to dispatch clients via a packet-switched network, such as the Internet, by disclosing a network dispatch manager, a dispatch gateway, a method for a network dispatch manager to provide dispatch service, and a method for a dispatch gateway to provide dispatch service. Dispatch service is provided via a multicast capable, packet-switched network (114) connecting a network dispatch manager (112) to dispatch gateways (115–116) and a packet-switched network (120), such as the Internet, connecting the dispatch gateways to dispatch clients (124,126). The network dispatch manager (112) assigns a multicast group to each dispatch gateway and uses the multicast group to multicast voice packets to the dispatch gateways (115–116). The dispatch gateways (115–116), in turn, perform any required packet duplication needed to forward the voice packets, via the packet-switched network (120), to the dispatch clients involved in the dispatch call. Thus, dispatch service can be provided to dispatch clients in addition to wireless devices.

14 Claims, 3 Drawing Sheets

300

NETWORK DISPATCH MANAGER, DISPATCH GATEWAY, AND A METHOD FOR PROVIDING DISPATCH SERVICE TO DISPATCH CLIENTS VIA A PACKET-SWITCHED NETWORK

CROSS-REFERENCE TO RELATED APPLICATION

This application is related to a co-pending application, filed on even date herewith and assigned to the assignee of the instant application, entitled "METHOD AND APPARATUS FOR PROVIDING DISPATCH SERVICE TO DISPATCH CLIENTS VIA A PACKET-SWITCHED NETWORK" having Ser. No. 09/322,675 and which application is hereby incorporated by reference verbatim, with the same effect as though the prior applications were fully and completely set forth herein.

FIELD OF THE INVENTION

The present invention relates generally to communication systems and, in particular, to providing dispatch service to dispatch clients in a wireless communication system via a packet-switched network.

BACKGROUND OF THE INVENTION

Wireless communication systems and, specifically, wireless dispatch systems are known. Such wireless dispatch systems provide dispatch services that allow groups of mobile users to communicate spontaneously as a group without the need for arranging a conference call. In today's wireless dispatch systems, each group member must carry a radiophone device, and remain within the coverage area of the dispatch system to maintain communication with the group.

With the recent proliferation of Internet technologies and the ubiquitous nature of Internet access today, a great variety of existing technologies are integrating with and exploiting the Internet. Integration of wireless dispatch systems with the Internet, could enable dispatch users to maintain dispatch communication using a computer connected to the Internet, for example, in place of a radio-telephone device that must remain within the coverage area of the dispatch system. Thus, a group of users, some with radio-telephones and others, dispatch clients, with computers connected to the Internet from anywhere in the world, could communicate as a group just as groups of radio-telephone users do today.

Therefore, a need exists for an apparatus and method for providing dispatch service to dispatch clients via a packet-switched network such as the Internet.

DESCRIPTION OF A PREFERRED EMBODIMENT

Figure 1:
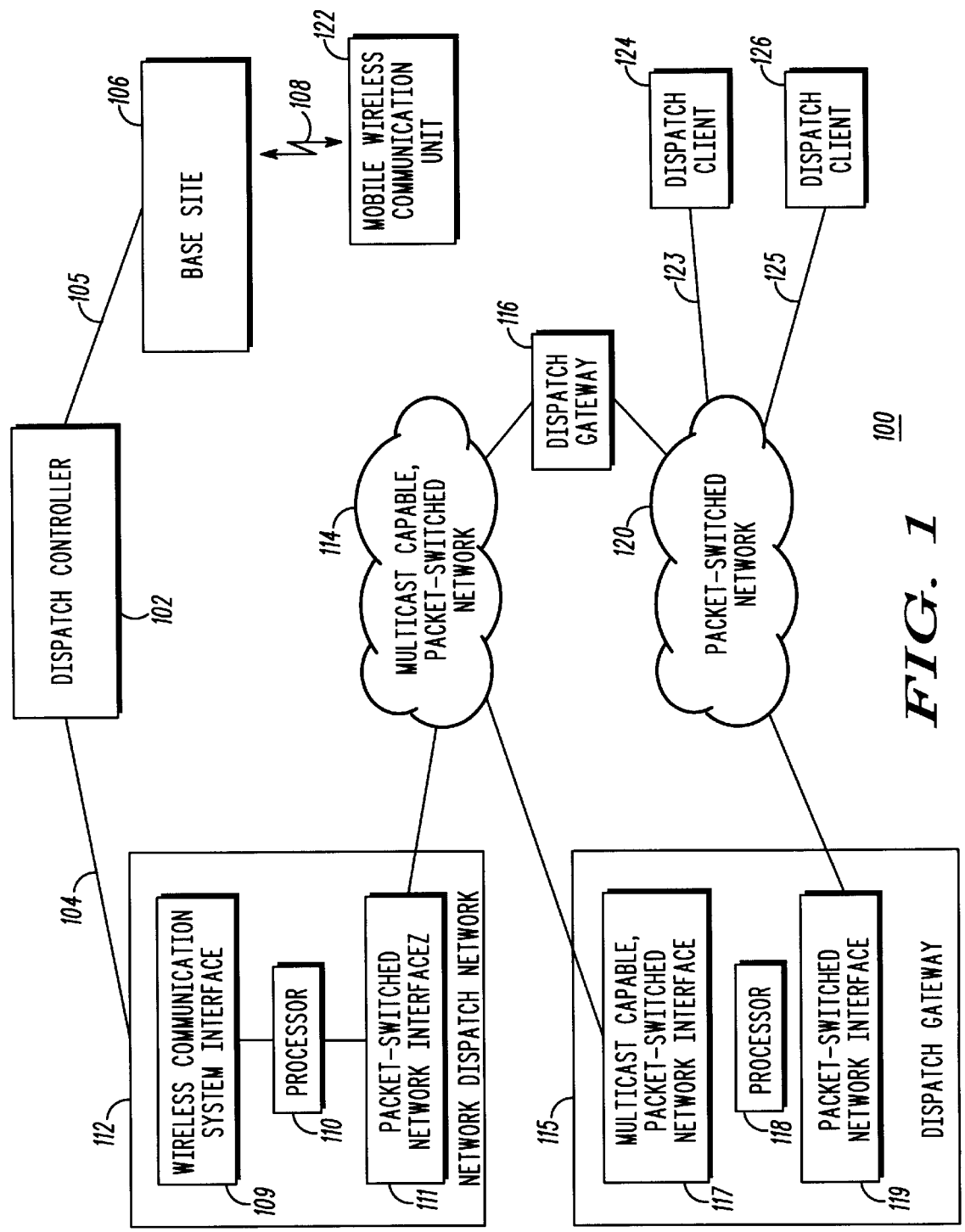
FIG. 1 is a block diagram depiction of a communication system in accordance with a preferred embodiment of the present invention.

The present invention addresses the need for providing dispatch service to dispatch clients via a packet-switched network, such as the Internet, by disclosing a network dispatch manager, a dispatch gateway, a method for a network dispatch manager to provide dispatch service, and a method for a dispatch gateway to provide dispatch service. Dispatch service is provided via a multicast-capable, packet-switched network connecting a network dispatch manager to dispatch gateways and a packet-switched network connecting the dispatch gateways to dispatch clients. The network dispatch manager assigns a multicast group to each dispatch group and uses the multicast group to multicast voice packets to the dispatch gateways. The dispatch gateways, in turn, perform any required packet duplication needed to forward the voice packets, via the packet-switched network, to the dispatch clients involved in the dispatch call. Thus, dispatch service can be provided to dispatch clients in addition to wireless devices.

The present invention encompasses a method for a network dispatch manager in a communication system infrastructure to provide dispatch service to dispatch clients connected to a dispatch gateway via a packet-switched network. The network dispatch manager receives a voice signal. When the voice signal corresponds to a dispatch group, the network dispatch manager determines a multicast group that is assigned to the dispatch group, bundles a portion of the voice signal into a packet for transport via a multicast-capable, packet-switched network, and multicasts the packet on the multicast-capable, packet-switched network using the multicast group.

Further, the present invention encompasses a method for a dispatch gateway to provide dispatch service to at least one dispatch client connected to a communication system infrastructure via a packet-switched network. The dispatch gateway receives a packet containing voice information and a destination client identifier from a network dispatch manager via a multicast-capable, packet-switched network. The dispatch gateway determines the packet-switched network address of each dispatch client of the at least one dispatch client served by the dispatch gateway that corresponds to the destination client identifier. The dispatch gateway then forwards, via the packet-switched network, the voice information of the packet to each dispatch client served by the dispatch gateway that corresponds to the destination client identifier using the packet-switched network address determined for each dispatch client.

Thirdly, the present invention encompasses a network dispatch manager apparatus. The network dispatch manager comprises a wireless communication system interface, a processor, and a packet-switched network interface. The wireless communication system interface receives a voice signal. When the voice signal corresponds to a dispatch group, the processor determines a multicast group that is assigned to the dispatch group and bundles a portion of the voice signal into a packet for transport via a multicast-capable, packet-switched network. The packet-switched network interface then multicasts the packet on the multicast-capable, packet-switched network using the multicast group. When the voice signal corresponds to a dispatch individual, the processor determines a dispatch gateway associated with the dispatch individual and bundles a portion of the voice signal into a packet for transport via the multicast-capable, packet-switched network. The packet-switched network interface then unicasts the packet to the dispatch gateway via the multicast-capable, packet-switched network.

Additionally, the present invention also encompasses a dispatch gateway apparatus. The dispatch gateway comprises a multicast-capable, packet-switched network interface, a packet-switched network interface, and a processor. The multicast-capable, packet-switched network interface receives a packet containing voice information and a destination client identifier from a network dispatch manager via a multicast-capable, packet-switched network. The processor determines a packet-switched network address of each dispatch client served by the dispatch gateway that corresponds to the destination client identifier. The processor also instructs the packet-switched network interface to forward, via a packet-switched network, voice information from the packet to each dispatch client served by the dispatch gateway that corresponds to the destination client identifier, using the packet-switched network address of each dispatch client.

Figure 2:
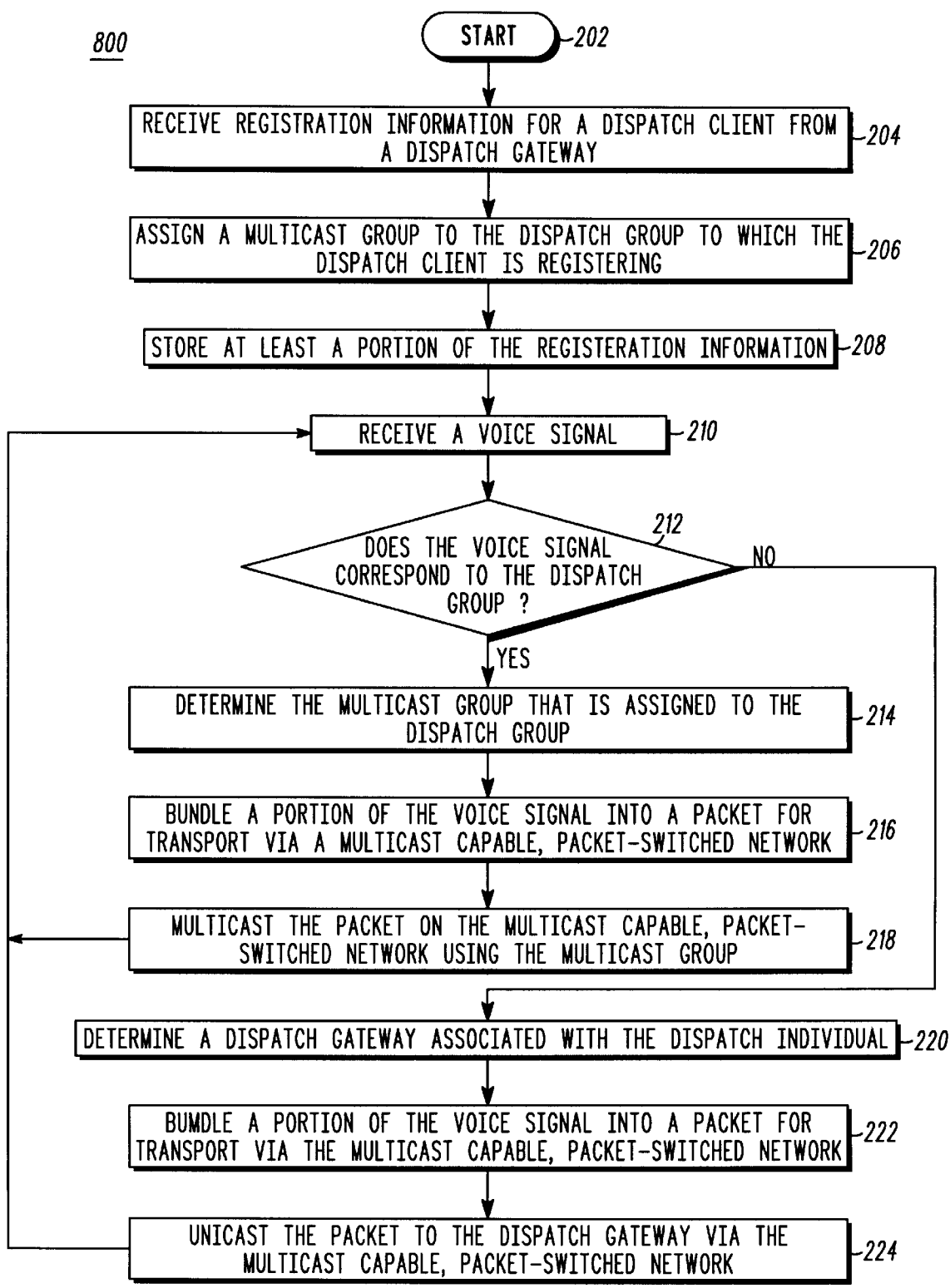
FIG. 2 is a logic flow diagram of steps executed by a network dispatch manager in accordance with a preferred embodiment of the present invention.
Figure 3:
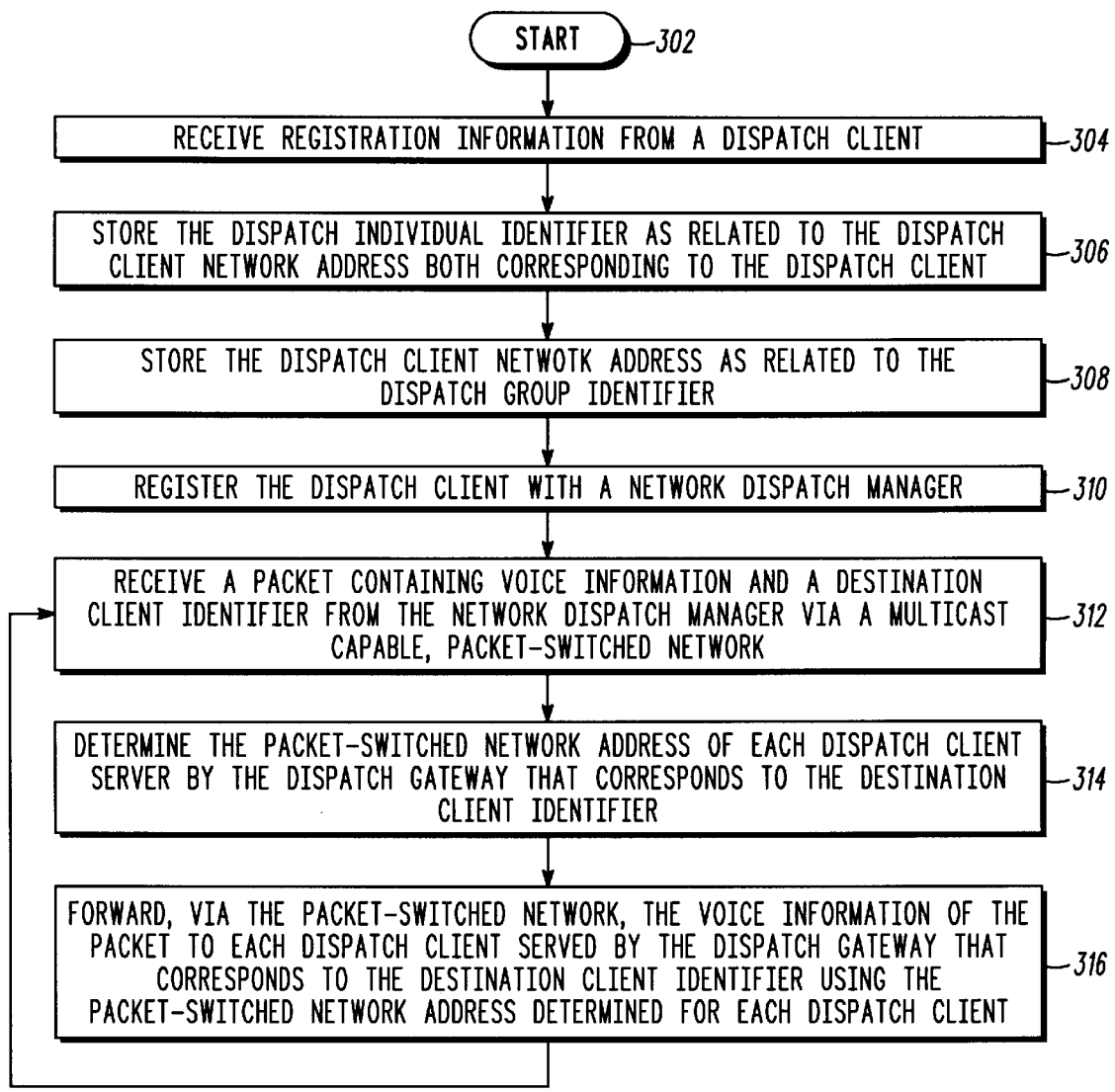
FIG. 3 is a logic flow diagram of steps executed by a dispatch gateway in accordance with a preferred embodiment of the present invention.

The present invention can be more fully understood with reference to FIGS. 1–3. FIG. 1 is a block diagram depiction of a communication system 100 in accordance with a preferred embodiment of the present invention. Communication system 100 comprises a mobile wireless communication unit 122, a plurality of dispatch clients 124 and 126, and a communication infrastructure. The communication infrastructure comprises a dispatch controller 102, a base site 106, a network dispatch manager 112, a multicast-capable, packet-switched network 114, a plurality of dispatch gateways 115–116, and a packet-switched network 120. Although only one base site 106 and one mobile wireless communication unit 122 are shown, it should be understood that a communication system in accordance with the present invention may comprise multiple base stations supporting numerous mobile wireless communication units. Likewise, although only two dispatch clients 124 and 126, two dispatch gateways 115–116, and one network dispatch manager 112 are shown, it is clearly understood that a communication system in accordance with the present invention may comprise multiple network dispatch managers and numerous dispatch gateways to serve a substantially unlimited number of dispatch clients.

Preferably, communication system 100 comprises an "iDEN" communication system, all components of which are commercially available from "MOTOROLA", Inc. of Schaumburg, Ill. Base site 106 preferably comprises an "iDEN" Enhanced Base Transceiver System (EBTS) sites, and dispatch controller 102 preferably comprises an "iDEN" Dispatch Application Processor (DAP), an "iDEN" Metro Packet Switch (MPS), and an "iDEN" Packet Duplicator. Accordingly, the mobile wireless communication unit 122 preferably comprises an "iDEN" wireless phone.

In the preferred embodiment, the packet-switched network 120 is a packet-switched network utilizing the Internet Protocol, such as the worldwide Internet, and dispatch clients 124 and 126 comprise computer devices such as personal computers that are connected to the packet-switched network 120 while executing a dispatch client application program. A preferred network dispatch manager and a preferred dispatch gateway each comprises a computer workstation platform. Such computer workstation platforms comprise conventional circuitry operated and controlled by routinely developed software, such as the circuitry and software used in central processing units and network interface cards (NICs).

In the preferred embodiment, the network dispatch manager 112 interfaces to the dispatch controller 102 via interface 104. Likewise, the base site 106 interfaces to the dispatch controller 102 via interface 105. Preferably, the interfaces 104 and 105 are logically, if not physically, equivalent although the present invention does not require any equivalence of the interfaces. Base site 106 interfaces with the mobile wireless communication unit 122 via air interface 108. The air interface 108 is preferably a standard "IDEN" air interface. While in contrast, dispatch clients 124 and 126 preferably interface with the packet-switched network 120 via interfaces 123 and 125, respectively.

Operation of the preferred communication system 100, network dispatch manager 112, and dispatch gateways 115 and 116, in accordance with the present invention, occurs substantially as follows. A wireless communication system interface 109 of the network dispatch manager 112 receives a voice signal corresponding to a dispatch group via interface 104. Although the dispatch group may comprise any group of mobile wireless communication units and/or dispatch clients, consider, for the purpose of illustration, that the dispatch group comprises mobile wireless communication unit 122 and dispatch clients 124 and 126. Although the voice signal may originate from any dispatch group member, consider that the voice signal originated from the mobile wireless communication unit 122, again, for the purpose of illustration. Further, in the preferred embodiment, the voice signal comprises speech encoded using Vector Sum Excited Linear Predicting (V,SELP) compression.

Since the voice signal corresponds to a dispatch group, processor 110 of the network dispatch manager 112 determines a multicast group that is assigned to the dispatch group. Preferably, the network dispatch manager 112. knows the call type (e.g., dispatch group or dispatch individual) of the call associated with the voice signal, as such information is typically necessary for setting up the call initially. Also, the network dispatch manager 112 preferably assigned a multicast group to the dispatch group previously. Thus, determining what multicast group is assigned to the dispatch group involves retrieving the previously stored assignment. If the voice signal corresponds to a dispatch individual instead of a dispatch group, the processor 110 determines a dispatch gateway associated with the dispatch individual. The network dispatch manager 112 preferably associated the dispatch gateway with the dispatch individual at the time the corresponding dispatch client registered.

The processor 110 bundles a portion of the voice signal into a packet for transport to one or more dispatch gateways via the multicast-capable, packet-switched network 114. Preferably, a portion of the VSELP information is extracted from the voice signal and used to create an internet protocol (IP) packet. In the preferred embodiment, all of the VSELP information would be packetized as such to form as many IP packets as necessary to convey the voice signal via the packet-switched network 114.

Packet-switched network 114 preferably uses the Internet Group Membership Protocol (IGMP) for allowing data gateways to register multicast group memberships with network dispatch managers. IGMP provides the ability to broadcast packets to multiple recipients using a single address, called a multicast group address. A packet sent using a multicast group address is routed by a multicast-capable network to all destinations registered to that multicast group. As used herein, the term "multicast group" refers to both a multicast group address and the group of clients registered using the multicast group address, since a multicast group address is shared by the members of the corresponding multicast group.

When the voice signal corresponds to a dispatch individual, the packet-switched network interface 111 unicasts the packet to the dispatch gateway determined, via the packet-switched network 114. Dispatch clients preferably register for dispatch service with a particular dispatch gateway. For the purposes of illustration, consider that the dispatch client 124 registered for dispatch service with dispatch gateway 116, and dispatch client 126 registered with dispatch gateway 115. Since both dispatch clients 124 and 126 are in the dispatch group, both dispatch gateways will be registered to the multicast group assigned to the dispatch group. When the voice signal corresponds to a dispatch group (i.e., the dispatch group), a packet-switched network interface 111 multicasts the packet (i.e., the packetized voice signal) on the multicast-capable, packet-switched network 114 using the multicast group determined. Thus, the both dispatch gateways 115 and 116 receive the multicasted packet.

A multicast-capable, packet-switched network interface 117 of dispatch gateway 115 receives the packet containing voice information and a destination client identifier from a network dispatch manager via the packet-switched network 114. A processor 118 of dispatch gateway 115 then determines a packet-switched network address of each dispatch client served by the dispatch gateway that corresponds to the destination client identifier. Preferably, the packet-switched network address a dispatch client is its IP address, since the packet-switched network 120 is preferably the Internet. When the destination client identifier is a dispatch individual identifier, the processor 118 retrieves the packet-switched network address of the dispatch client that corresponds to the dispatch individual identifier. When the destination client identifier is a dispatch group identifier instead, the processor 118 retrieves the packet-switched network addresses of all the dispatch clients that correspond to the dispatch group identifier.

The processor 118 instructs a packet-switched network interface 119 to forward, via the packet-switched network 120, voice information from the packet to each dispatch client served by the dispatch gateway that corresponds to the destination client identifier using the packet-switched network address of each dispatch client. Thus, dispatch gateway 115 forwards the packetized voice signal to dispatch client 126 using the IP address of dispatch client 126. Dispatch gateway 116 likewise forwards the packetized voice signal to dispatch client 124 using the IP address of dispatch client 124.

If both dispatch clients 124 and 126 had instead registered with dispatch gateway 115, dispatch gateway 115 would have retrieved the IP addresses of both dispatch clients 124 and 126 as corresponding to the destination client identifier, i.e., the dispatch group identifier. The dispatch gateway 115 would have forwarded the packetized voice signal to dispatch client 124, duplicated the packetized voice signal, and forwarded the duplicate to dispatch client 126. Such packet duplication is necessary because, unlike network 114, packet-switched network 120 preferably does not support multicasting. Each packet is unicast is a single destination thus requiring packet duplication when multiple destinations are involved.

By providing dispatch service to dispatch clients in the manner described above, the present invention discloses a communication system that provides dispatch service to dispatch clients via the Internet. The division of functionality between network dispatch managers and dispatch gateways provides an architecture that is efficient and scalable. The present invention incorporates multicasting technology into the interface between network dispatch managers and the dispatch gateways. Thus, the network dispatch managers do not need to incur the overhead of packet duplication. This efficiency leads to scalability since dispatch gateways can be added to the disclosed architecture to support an increasing dispatch client base with minimal additional loading of the network dispatch manager. Further, additional network dispatch managers can be added also, should call traffic levels require it.

FIG. 2 is a logic flow diagram 200 of steps executed by a network dispatch manager in accordance with a preferred embodiment of the present invention. The logic flow begins (202) when the network dispatch manager receives (204) registration information for a dispatch client from a dispatch gateway. The registration information preferably comprises a dispatch gateway identifier that corresponds to the dispatch gateway, a dispatch individual identifier that corresponds to the dispatch client registering, and a dispatch group identifier that corresponds to the dispatch group to which the dispatch client is registering. The network dispatch manager, in response to receiving the registration information, preferably registers the dispatch client with a dispatch controller in the communication infrastructure. The dispatch controller, which preferably performs call processing and dispatch call control functions, is thus notified of the dispatch client's registration to the system and the dispatch group to which the dispatch client is registering.

The network dispatch manager then assigns (206) a multicast group to the dispatch group, if a multicast group has not already been assigned to the dispatch group. The network dispatch manager also stores (208) at least a portion of the registration information received. Preferably, the dispatch individual identifier is stored as related to the dispatch gateway identifier, and the dispatch group identifier is stored as related to a multicast group identifier (e.g., multicast group address) that corresponds to the multicast group. When the network dispatch manager receives (210) a voice signal, the network dispatch manager determines (212) whether the voice signal corresponds to a dispatch group or a dispatch individual.

If the voice signal corresponds to a dispatch group, the network dispatch manager determines (214) a multicast group that is assigned to the dispatch group. This is preferably performed by retrieving the multicast group identifier related to the dispatch group identifier that corresponds to the dispatch group. The network dispatch manager then bundles (216) a portion of the voice signal into a packet and multicasts (218) the packet on a multicast-capable, packet-switched network using the multicast group. If the voice signal instead corresponds to a dispatch individual, the network dispatch manager determines (220) a dispatch gateway associated with the dispatch individual. Again, this is preferably performed by retrieving the information stored at the time of registration. The network dispatch manager then bundles (222) a portion of the voice signal into a packet and unicasts (224) the packet to the dispatch gateway via the multicast-capable, packet-switched network. Upon multicasting (218) or unicasting (224) the packet (or packets), the network dispatch manager returns to step 210 to process the next voice signal received.

FIG. 3 is a logic flow diagram 300 of steps executed by a dispatch gateway in accordance with a preferred embodiment of the present invention. The logic flow begins (302) when the dispatch gateway receives (304) registration information from a dispatch client. The registration information preferably comprises a dispatch individual identifier that corresponds to the dispatch client registering, a dispatch group identifier that corresponds to the dispatch group to which the dispatch client is registering, and the dispatch client network address (e.g., the IP address of the dispatch client) that corresponds to the dispatch client.

The dispatch gateway stores (306) the dispatch individual identifier as related to the dispatch client network address.

The dispatch gateway also stores (308) the dispatch group identifier as related to the dispatch client network address, if the dispatch group identifier is not currently stored. Since multiple dispatch client network addresses may be related to the same dispatch group identifier, the dispatch gateway may actually store the dispatch client network address as related to the dispatch group identifier already stored. In response to receiving the registration information, the dispatch gateway also registers (310) the dispatch client with a network dispatch manager as described above.

The dispatch gateway receives (312) a packet containing voice information and a destination client identifier from the network dispatch manager via a multicast-capable, packet-switched network. The dispatch gateway then determines (314) the packet-switched network address of each dispatch client served by the dispatch gateway that corresponds to the destination client identifier. When the destination client identifier is a dispatch individual identifier, the dispatch gateway preferably retrieves the dispatch client network address related to the dispatch individual identifier. When the destination client identifier is instead a dispatch group identifier, the dispatch gateway preferably retrieves the one or more dispatch client network addresses related to the dispatch group identifier.

The dispatch gateway then forwards (316), via the packet-switched network, the voice information of the packet to each dispatch client served by the dispatch gateway that corresponds to the destination client identifier using the packet-switched network address determined for each dispatch client. As described above with regard to FIG. 1, the voice information that is forwarded requires packet duplication when more than one dispatch client is involved. Upon forwarding the voice information, the dispatch gateway returns to step 312 to process the next packet received.

Thus, dispatch clients and/or mobile wireless communication units are able to take part in dispatch communication as a dispatch group utilizing the present invention. Today dispatch communication between mobile wireless communication units is common, but limited. Such communication is limited by location constraints, i.e. mobile wireless communication units must remain within the wireless coverage area of a dispatch system, and limited to dispatch communication with other mobile wireless communication unit users. Dispatch clients, in contrast, can be located anywhere where Internet access is available. Also since a dispatch client may be run on a laptop computer, for example, a user need not necessarily have both a computer and a mobile wireless communication unit. Thus, the present invention expands the accessibility of dispatch communication service to networked computers.

The descriptions of the invention, the specific details, and the drawings mentioned above, are not meant to limit the scope of the present invention. It is the intent of the inventors that various modifications can be made to the present invention without varying from the spirit and scope of the invention, and it is intended that all such modifications come within the scope of the following claims and their equivalents.

What is claimed is:

1. A method for a network dispatch manager in a communication system infrastructure to provide dispatch service to dispatch clients connected to a dispatch gateway via a packet-switched network, the method comprising the steps of:

receiving a voice signal; and when the voice signal corresponds to a dispatch group:

determining a multicast group that is assigned to the dispatch group;

bundling a portion of the voice signal into a packet for transport via a multicast-capable, packet-switched network;

multicasting the packet on the multicast-capable, packet-switched network using the multicast group;

when the voice signal corresponds to a dispatch individual, determining a dispatch gateway associated with the dispatch individual;

bundling a portion of the voice signal into a packet for transport via the multicast-capable, packet-switched network;

unicasting the packet to the dispatch gateway via the, multicast-capable, packet-switched network;

receiving registration information for a dispatch client from a dispatch gateway;

storing at least a portion of the registration information, wherein the registration information comprises a dispatch gateway identifier, a dispatch individual identifier that corresponds to the dispatch client, and a dispatch group identifier that corresponds to the dispatch group to which the dispatch client is registering; and assigning a multicast group to the dispatch group, wherein the step of storing at least a portion of the registration information comprises the step of storing the dispatch group identifier as related to a multicast group identifier that corresponds to the multicast group.

2. The method of claim 1, wherein the multicast-capable, packet-switched network uses the Internet Group Membership Protocol (IGMP).

3. The method of claim 1, wherein the voice signal comprises speech encoded using Vector Sum Excited Linear Predicting (VSELP) compression.

4. The method of claim 1, wherein the voice signal comprises encoded speech information that originated from a mobile wireless communication unit.

5. The method of claim 1, wherein the step of storing at least a portion of the registration information comprises the step of storing the dispatch individual identifier as related to the dispatch gateway identifier.

6. The method of claim 1, wherein the step of determining a multicast group comprises the step of retrieving the multicast group identifier related to the dispatch group identifier that corresponds to the dispatch group.

7. A method for a dispatch gateway to provide dispatch service to at least one dispatch client connected to a communication system infrastructure via a packet-switched network, the method comprising the steps of:

receiving a packet containing voice information and a destination client identifier from a network dispatch manager via a multicast-capable, packet-switched network;

determining the packet-switched network address of each dispatch client of the at least one dispatch client served by the dispatch gateway that corresponds to the destination client identifier;

forwarding, via the packet-switched network, the voice information of the packet to each dispatch client served by the dispatch gateway that corresponds to the destination client identifier using the packet-switched network address determined for each dispatch client;

receiving registration information from a dispatch client of the at least one dispatch client;

storing at least a portion of the registration information, wherein the registration information comprises a dispatch client network address that corresponds to the dispatch client, a dispatch individual identifier that corresponds to the dispatch client, and a dispatch group identifier that corresponds to a dispatch group to which the dispatch client is registering and wherein the step of storing comprises the steps of:

when the dispatch group identifier is not currently stored, storing the dispatch group identifier as related to the dispatch client network address to produce at least one dispatch client network address related to the dispatch group identifier; and when the dispatch group identifier is currently stored, storing the dispatch client network address as related to the dispatch group identifier already stored to add to the at least one dispatch client network address related to the dispatch group identifier.

8. The method of claim 7, wherein the at least one dispatch client comprises a computer application executed by a personal computer.

9. The method of claim 7, further comprising the step of registering, in response to receiving the registration information, the dispatch client with the network dispatch manager.

10. The method of claim 7, wherein the step of storing comprises the step of storing the dispatch individual identifier as related to the dispatch client network address.

11. The method of claim 10, wherein the step of determining comprises the step of retrieving, when the destination client identifier is a dispatch individual identifier, the dispatch client network address related to the dispatch individual identifier.

12. The method of claim 7, wherein the step of determining comprises the step of retrieving, when the destination client identifier is a dispatch group identifier, the at least one dispatch client network address related to the dispatch group identifier.

13. A network dispatch manager comprising:

a wireless communication system interface tat receives a voice signal;

a processor, coupled to the wireless communication system interface, that, when the voice signal corresponds to a dispatch group, determines a multicast group that is assigned to the dispatch group and bundles a portion of the voice signal into a packet for transport via a multicast-capable, packet-switched network, when the voice signal corresponds to a dispatch individual, determines a dispatch gateway associated with the dispatch individual, bundles a portion of the voice signal into a packet for transport via the multicast-capable, packet-switched network, and unicasts the packet to the dispatch gateway via the multicast-capable, packet-switched network, that receives registration information for a dispatch client from a dispatch gateway, that stores at least a portion of the registration information, wherein the registration information comprises a dispatch gateway identifier, a dispatch individual identifier that corresponds to the dispatch client, and a dispatch group identifier that corresponds to the dispatch group to which the dispatch client is registering, and that assigns a multicast group to the dispatch group, wherein the step of storing at least a portion of the registration information comprises the step of storing the dispatch group identifier as related to a multicast group identifier that corresponds to the multicast group;

a packet-switched network interface, coupled to the processor, that, when the voice signal corresponds to a dispatch group, multicasts the packet on the multicast-capable, packet-switched network using the multicast group, and when the voice signal corresponds to a dispatch individual, unicasts the packet to the dispatch gateway via the multicast-capable, packet-switched network.

14. A dispatch gateway comprising:

a multicast-capable, packet-switched network interface that receives a packet containing voice information and a destination client identifier from a network dispatch manager via a multicast-capable, packet-switched network;

a packet-switched network interface; and a processor, coupled to the multicast capable, packet-switched network interface and the packet-switched network interface, that determines a packet-switched network address of each dispatch client served by the dispatch gateway that corresponds to the destination client identifier, that instructs the packet-switched network interface to forward, via a packet-switched network, voice information from the packet to each dispatch client served by the dispatch gateway that corresponds to the destination client identifier using the packet-switched network address of each dispatch client that receives registration information from a dispatch client, wherein the registration information comprises a dispatch client network address that corresponds to the dispatch client, a dispatch individual identifier that corresponds to the dispatch client, and a dispatch group identifier that corresponds to a dispatch group to which the dispatch client is registering, and that when the dispatch group identifier is not currently stored, stores the dispatch group identifier as related to the dispatch client network address to produce at least one dispatch client network address related to the dispatch group identifier and when the dispatch group identifier is currently stored, stores the dispatch client network address as related to the dispatch group identifier already stored to add to the at least one dispatch client network address related to the dispatch group identifier.

* * * * *

UNITED STATES PATENT AND TRADEMARK OFFICE
CERTIFICATE OF CORRECTION

PATENT NO.   : 6,304,558 B1
DATED        : October 16, 2001
INVENTOR(S)  : Mysore Page 1 of 1

It is certified that error appears in the above-identified patent and that said Letters Patent is hereby corrected as shown below:

Column 9,
Line 38, reads "tat", should be -- that --

Signed and Sealed this

Ninth Day of April, 2002

Attest:

JAMES E. ROGAN
Attesting Officer          Director of the United States Patent and Trademark Office